US008899695B2

United States Patent
Tanaka et al.

(10) Patent No.: US 8,899,695 B2
(45) Date of Patent: Dec. 2, 2014

(54) VEHICLE BRAKE SYSTEM

(75) Inventors: Kentarou Tanaka, Saitama (JP);
Kunimichi Hatano, Saitama (JP); Arata Inoue, Saitama (JP); Hidetoshi Kobori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/315,699

(22) Filed: Dec. 9, 2011

(65) Prior Publication Data

US 2012/0161506 A1 Jun. 28, 2012

(30) Foreign Application Priority Data

Dec. 23, 2010 (JP) ................... 2010-286819

(51) Int. Cl.
| | |
|---|---|
| *B60T 11/20* | (2006.01) |
| *B60T 7/04* | (2006.01) |
| *B60T 8/40* | (2006.01) |
| *B60T 13/66* | (2006.01) |
| *B60T 13/68* | (2006.01) |
| *B60T 13/74* | (2006.01) |

(52) U.S. Cl.
CPC ............. *B60T 7/042* (2013.01); *B60T 8/4081* (2013.01); *B60T 13/662* (2013.01); *B60T 13/686* (2013.01); *B60T 13/745* (2013.01)
USPC ............ 303/14; 303/9.61; 303/9.62; 303/152

(58) Field of Classification Search
USPC .................. 303/14, 15, 119.1, 119.2, 116
See application file for complete search history.

(56) References Cited

U.S. PATENT DOCUMENTS

| | | | | |
|---|---|---|---|---|
| 5,016,178 A | * | 5/1991 | Kuwana et al. .................. 701/79 |
| 5,558,414 A | * | 9/1996 | Kubota ..................... 303/122.08 |
| 5,882,093 A | * | 3/1999 | Enomoto et al. .............. 303/152 |
| 5,895,100 A | * | 4/1999 | Ito et al. ........................ 303/152 |

(Continued)

FOREIGN PATENT DOCUMENTS

| | | |
|---|---|---|
| DE | 41 10 254 A1 | 10/1992 |
| DE | 195 24 952 A1 | 1/1997 |
| DE | 102 16 484 A1 | 10/2003 |

(Continued)

OTHER PUBLICATIONS

Chinese Office Action issued on Jan. 24, 2014 in the corresponding Chinese Patent Application No. 201110429672.0 with the English translation thereof.

*Primary Examiner* — Robert A Siconolfi
*Assistant Examiner* — James Hsiao
(74) *Attorney, Agent, or Firm* — Carrier Blackman & Associates, P.C.; William D. Blackman; Joseph P. Carrier

(57) ABSTRACT

In a brake-by-wire vehicle brake system that uses a solenoid shut-off valve (24a, 24b), the electric power supplied to the solenoid (33) of the solenoid shut-off valve is controlled so as to decelerate a movement of a plunger (31, 32) of the valve as the plunger reaches a point immediately adjacent to a terminal point thereof. Thereby, a highly responsive property can be achieved while the noises that are generated by the plunger striking a stopper (36) or a valve seat (34) can be minimized. When actuating the plunger in the valve closing direction, the solenoid may receive electric power at a first level, a second level lower than the first level and a third level intermediate between the first and second levels in that order.

7 Claims, 7 Drawing Sheets

(56) References Cited

U.S. PATENT DOCUMENTS

| | | | |
|---|---|---|---|
| 5,951,115 A * | 9/1999 | Sakai et al. | 303/3 |
| 5,984,432 A * | 11/1999 | Otomo et al. | 303/119.2 |
| 6,070,953 A * | 6/2000 | Miyago | 303/152 |
| 6,142,586 A * | 11/2000 | Sakai | 303/152 |
| 6,604,795 B2 | 8/2003 | Isono et al. | |
| 6,676,230 B2 * | 1/2004 | Kuno et al. | 303/114.3 |
| 7,168,679 B2 * | 1/2007 | Shirase et al. | 251/129.02 |
| 7,540,572 B2 * | 6/2009 | Nakamura | 303/122.05 |
| 7,942,483 B2 | 5/2011 | Hatano | |

| | | |
|---|---|---|
| 2012/0062023 A1 | 3/2012 | Ohkubo et al. |

FOREIGN PATENT DOCUMENTS

| | | |
|---|---|---|
| DE | 601 21 714 T2 | 7/2007 |
| DE | 10 2007 006 545 A1 | 8/2007 |
| JP | 11-243013 A | 9/1999 |
| JP | 2005-280569 A | 10/2005 |
| JP | 2009-227023 A | 10/2009 |
| JP | 2010-042702 A | 2/2010 |
| WO | 2010/119889 A1 | 10/2010 |

* cited by examiner

VEHICLE BRAKE SYSTEM

TECHNICAL FIELD

The present invention relates to a brake-by-wire vehicle brake system including a solenoid shut-off valve in a fluid path thereof, and in particular to a technology for reducing noises generated from such a solenoid shut-off valve.

BACKGROUND OF THE INVENTION

In electric vehicles and hybrid vehicles, it is a common practice to use an electric motor which is connected to the drive axle of the vehicle as a generator that produces electric power and provides a braking force at the same time when decelerating the vehicle. This is called as regenerative braking. Such a brake-by-wire vehicle brake system that combines the hydraulic braking and the regenerative braking may also be incorporated with an ABS (anti-lock brake system) and a VSA (vehicle stability assist) system as disclosed in JP 2009-227023. In such a vehicle brake system, an ABS hydraulic unit and a VSA hydraulic unit are combined with a motor actuated cylinder which is typically provided with a simulator for producing a brake pedal reaction.

A brake-by-wire system is typically provided with a conventional master cylinder which is directly connected to the brake pedal. In case of a failure in the brake system, the hydraulic pressure produced from the master cylinder is forwarded to the wheel cylinders. However, in normal operation, the motor actuated cylinder provides the necessary brake fluid pressure which is actuated according to the stroke of the brake pedal detected by a stroke sensor while the output line of the master cylinder is shut off by a solenoid shut-off valve. This solenoid shut-off valve typically consists of a normally open solenoid valve which shuts every time the brake pedal is operated.

A normally open solenoid valve is normally held open by a return spring, and is closed by energizing the solenoid that displaces a plunger in a valve closing direction against the spring force of the return spring. The fully open position and fully closed position of the solenoid shut-off valve is defined by the plunger being engaged by corresponding mechanical stoppers. It is known that some impact noise is inevitable every time the plunger reaches the fully open position and the fully closed position under the spring force and the magnetic force, respectively.

In particular, in a brake-by-wire brake system, the solenoid valve in the output line of the master cylinder closes and opens every time the brake pedal is depressed and released so that any slight noise caused by the operation of the solenoid valve could create a problem. The noises may be reduced by reducing the electric power supplied to the solenoid valve, but it impairs the responsiveness of the solenoid valve, and is therefore not acceptable as a solution to the problem in most applications.

BRIEF SUMMARY OF THE INVENTION

In view of such problems of the prior art, a primary object of the present invention is to provide a brake-by-wire vehicle brake system that can provide a highly responsive property while minimizing the noises that are generated by a solenoid valve provided in an output line of the master cylinder.

According to the present invention, such an object can be accomplished by providing a vehicle brake system, comprising: a master cylinder configured to be actuated by a brake pedal and receive a supply of brake fluid from a reservoir; an input sensor for detecting an operation of the brake pedal; a motor actuated cylinder configured to be actuated by an electric motor according to a control signal and receive a supply of brake fluid from the reservoir; a solenoid shut-off valve provided in a fluid line between the master cylinder and the motor actuated cylinder, the solenoid shut-off valve comprising a plunger provided with a valve member, a valve seat provided in a housing of the solenoid valve and configured to cooperate with the valve member, a return spring urging the plunger in a valve opening direction, a solenoid for actuating the plunger in a valve closing direction when energized and a stopper for mechanically limiting a stroke of the plunger in the valve opening direction; and a control unit for providing the control signal to the motor actuated cylinder according to a detection signal from the input sensor and closing the solenoid shut-off valve when the master cylinder is actuated in response to the detection signal from the input sensor; wherein the control unit is configured to control electric power supplied to the solenoid to decelerate a movement of the plunger as the plunger reaches a point immediately adjacent to at least one of the stopper or the valve seat.

Thereby, the plunger is initially actuated at a relatively high speed but is decelerated as the plunger approaches a terminal point of the movement thereof, be it the position for fully closing the valve or the position for fully opening the valve, so that the impact noises that may be caused by the plunger striking the stopper or the valve seat can be minimized. Therefore, the solenoid shut-off valve can be actuated at a rapid rate without causing excessive noises.

According to a more specific aspect of the present invention, the control unit supplies electric power to the solenoid at a first level, a second level lower than the first level and a third level intermediate between the first and second levels in that order when actuating the plunger in the valve closing direction. Thereby, the plunger is initially allowed to be actuated at a rapid rate, and is decelerated during a time interval immediately preceding the fully closed position of the valve so that the valve can be closed at a rapid rate, but the plunger is decelerated before the valve member strikes the valve seat. As a result, a rapid response and a quiet valve closure can be achieved at the same time.

The power consumption of the solenoid can be made no different from that of the conventional arrangement if a time average of the first level and the second level is substantially equal to the third level.

According to another aspect of the present invention, the control unit supplies electric power to the solenoid at a fourth level which is significantly less than required to oppose the spring force of the return spring, a fifth level which is higher than the fourth level and at a zero level in that order when actuating the plunger in the valve opening direction.

Thereby, when actuating the plunger in the valve opening direction under the spring force of the return spring, the plunger is initially allowed to move in the valve opening direction without any significant resistance, but is thereafter resisted by the energization of the solenoid at the fifth level for a time interval immediately preceding the fully open position of the valve so that the speed of the plunger at the time of striking the stopper can be minimized, and the quick response and a quiet valve opening movement can be achieved at the same time.

When the brake pedal is rapidly depressed, as it means that a powerful braking is required, and the noises that may be produced from the solenoid shut-off valve is of no importance. Based on such a recognition, the control unit may not control the electric power supplied to the solenoid to decelerate a movement of the plunger when an operation speed of the brake pedal is greater than a threshold value.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
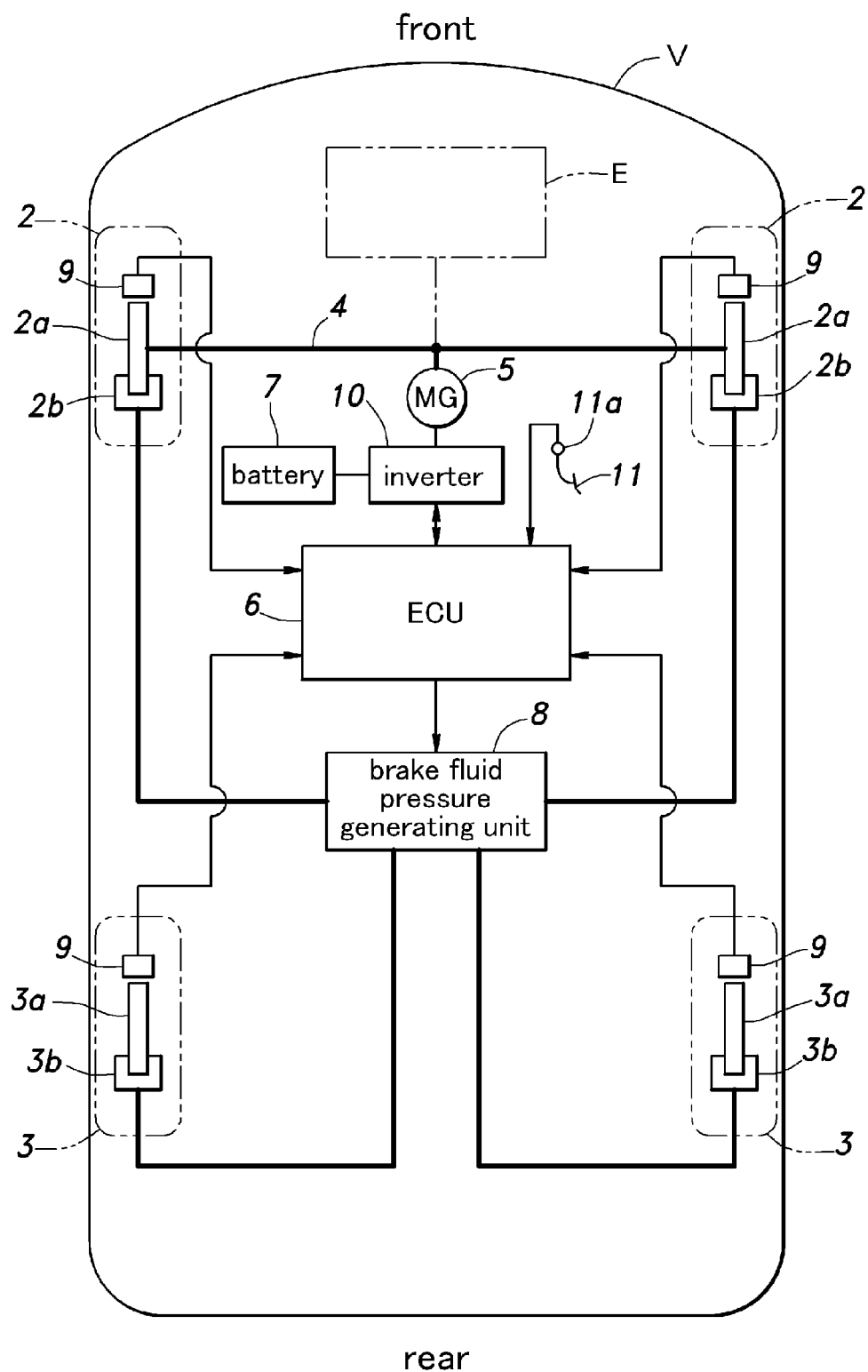
FIG. 1 is a schematic diagram showing a vehicle incorporated with a vehicle brake system embodying the present invention.

FIG. 1 shows a brake system of an electric or hybrid vehicle embodying the present invention. This vehicle V comprises a pair of front wheels 2 located on the front side thereof and a pair of rear wheels 3 located on the rear side thereof. The front wheels 2 are connected to front axles 4 which are in turn connected to a motor/generator 5 in a torque transmitting relationship via a differential gear device (not shown in the drawing).

The motor/generator 5 operates both as an electric motor for propelling the vehicle and a generator for providing a regenerative braking. More specifically, the motor/generator 5 can receive electric power from a rechargeable battery 7 serving as a power source via an inverter 10, and can also supply electric power to (recharge) the battery 7 by converting the kinetic energy into electric power by the regenerative braking.

A control unit (ECU) 6 incorporated with a CPU control circuit performs various control actions for the vehicle V including the distribution of braking force as will be described hereinafter. The control unit 6 is electrically connected to the inverter 10. In the case of an electric vehicle, the structure illustrated in FIG. 1 may be applied as it is, or, alternatively, an additional motor/generator for the rear wheels 3 may be included in the vehicle 1. In the case of a hybrid vehicle, the front axles 4 are additionally connected to the output shaft of an internal combustion engine E indicated by the double-dot chain dot lines in FIG. 1. The illustrated engine E is configured to drive the front wheels, but may also be configured to drive the rear wheels or all of the four wheels.

Each of the front and rear wheels 2, 3 is provided with a per se known disk brake including a disk 2a, 3a integrally attached to the wheel 2, 3 and a caliper incorporated with a wheel cylinder 2b, 3b. The wheel cylinder 2b, 3b is connected to a brake fluid pressure generating unit 8 via a per se known brake tubing. The brake fluid pressure generating unit 8 consists of a hydraulic circuit configured to distribute hydraulic brake pressure to the different wheels and adjust the hydraulic brake pressure level for each wheel.

A wheel speed sensor 9 is provided in association with each wheel 2, 3, and a displacement sensor 11a is provided in association with a brake pedal 11 (that is operated by a vehicle operator) to detect a brake operation amount or a brake depression stroke. The detection signals of the wheel speed sensors 9 and the displacement sensor 11a are forwarded to the control unit 6.

Upon detecting an output signal of the displacement sensor 11a of the brake pedal 11 becoming greater than zero, the control unit 6 performs a control action for braking. In the illustrated embodiment, the braking action is performed as that of a brake-by-wire system, and includes a regenerative cooperative control combining a regenerative braking and a hydraulic braking.

The brake system 1 of this vehicle V is described in the following with reference to FIG. 2. The brake system 1 consists of a brake-by-wire system that detects the brake operation amount (brake pedal stroke) of the brake pedal 11 by using the stroke sensor 11a (serving as an input amount sensor) and produces a brake fluid pressure according to the detected brake operation amount by using a motor actuated cylinder 13 (serving as a brake fluid pressure generating cylinder) configured to be actuated by an electric servo motor 12.

Figure 2:
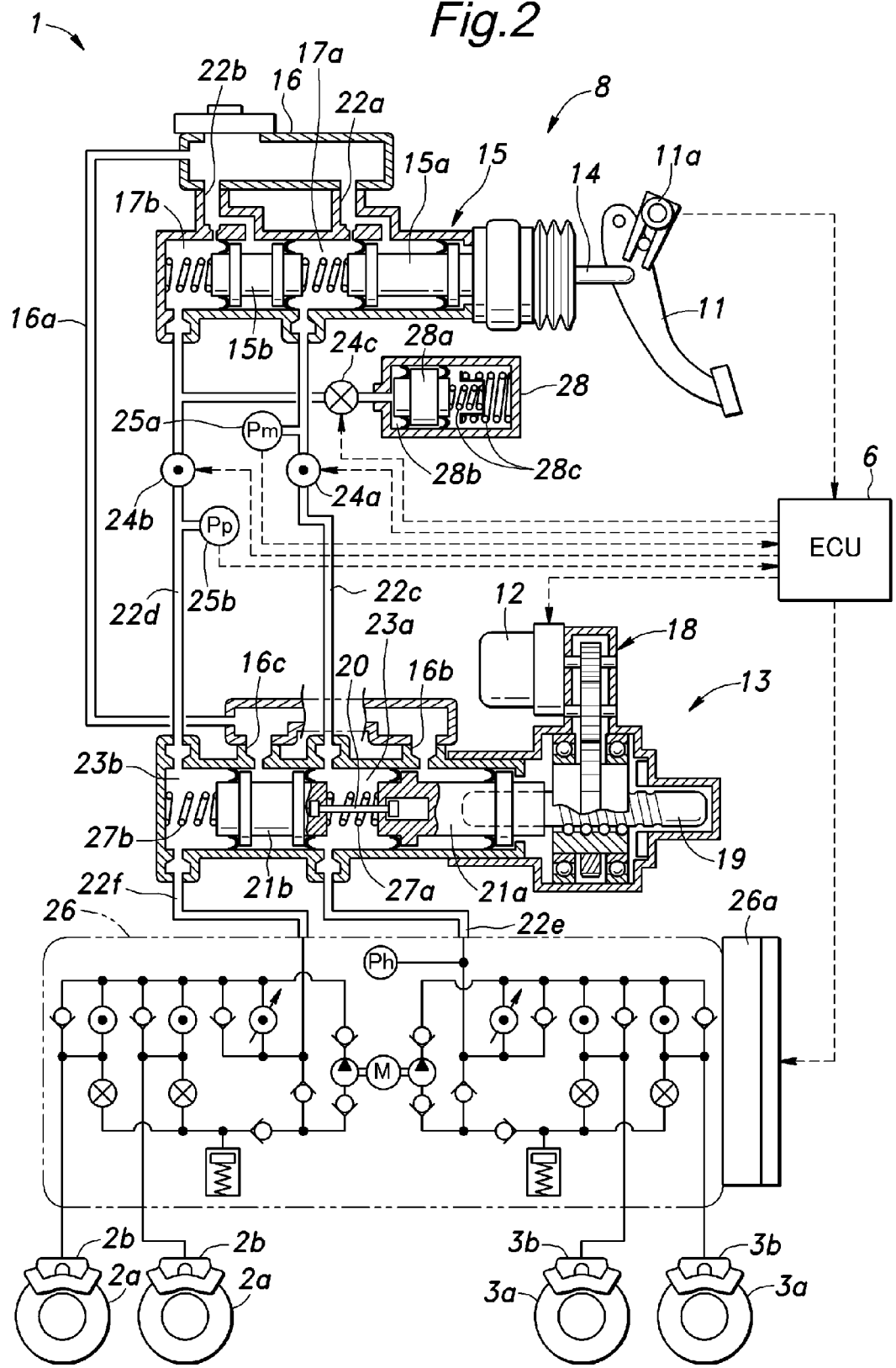
FIG. 2 is a diagram showing the overall structure of the vehicle brake system according to the present invention.

As shown in FIG. 2, an end of a rod 14 is connected to the brake pedal 11 which is in turn pivotally connected to the vehicle body so as to convert the angular movement of the brake pedal 11 into a substantially linear motion of the rod 14, and the other end of the rod 14 engages a first piston 15a of a master cylinder 15 of a tandem type in the direction to force the piston 15a into the master cylinder 15. The master cylinder 15 additionally receives therein a second piston 15b on the side of the first piston 15a facing away from the rod 14, and the first and second pistons 15a and 15b are both resiliently urged toward the rod 14 by respective springs. The brake pedal 11 is also urged by a spring (not shown in the drawing) such that the brake pedal 11 is held at the initial position shown in FIG. 2 by a stopper not shown in the drawing when the brake is not being operated.

The master cylinder 15 is provided with a reservoir tank 16 for receiving and feeding the brake fluid depending on the displacement of the two pistons 15a and 15b. The pistons 15a and 15b are each fitted with seal members to shut oil passages 22a and 22b communicating the interior of the master cylinder 15 with the reservoir tank 16, respectively. Inside the master cylinder 15, a first fluid chamber 17a is defined between the first and second pistons 15a and 15, and a second fluid chamber 17b is defined on the side of the second piston 15b facing away from the first piston 15a.

In addition to the electric servo motor 12, the motor actuated cylinder 13 is provided with a gear mechanism 18 connected to the electric servo motor 12, a screw rod 19 which is connected to the gear mechanism 18 via a ball screw mechanism for an axial movement, and a first piston 21a and a second piston 21b which are connected to the screw rod 19 coaxially and in tandem.

The second piston 21b is fixedly provided with a connecting member 20 projecting toward the first piston 21a, and the other end of the connecting member 20 is connected to the first piston 21a so as to allow a relative axial movement with the first piston 21a to a certain extent. Further, the first and second pistons 21a and 21b are both resiliently urged toward the screw rod 19 by respective springs 27a and 27b. In particular, the spring 27a urges the first and second pistons 21a and 21b away from each other. Thereby, the first piston 21a is able to advance (move toward the second piston 21a) independently from the second piston 21b, but is able to pull the second piston 21b back to the initial position via the connecting member 20 when the first piston 21a retreats.

The motor actuated cylinder 13 is provided with oil passages 16b and 16c which in turn communicate with the reservoir tank 16 via a communication passage 16a, and the pistons 21a and 21b are fitted with per se known seal members to shut the oil passages 16b and 16c as required. In the motor actuated cylinder 13, a first fluid pressure generating chamber 23a is defined between the first and second pistons 21a and 21b, and a second fluid pressure generating chamber 23b is defined on the side of the second piston 21b facing away from the first piston 21a.

The first fluid chamber 17a of the master cylinder 15 is communicated with the first fluid pressure generating chamber 23a of the motor actuated cylinder 13 via a fluid line 22c provided with a normally open solenoid valve 24a, and the second fluid chamber 17b of the master cylinder 15 is communicated with the second fluid pressure generating chamber 23b of the motor actuated cylinder 13 via a fluid line 22d provided with a normally open solenoid valve 24b. A master cylinder side brake pressure sensor 25a is provided on the fluid line 22c between the first fluid chamber 17a and the solenoid valve 24a upstream of the normally open solenoid valve 24a, and a motor actuated cylinder side brake pressure sensor 25b is provided on the fluid line 22d between the solenoid valve 24b and the second fluid pressure generating chamber 23b downstream of the normally open solenoid valve 24b.

Figure 3:
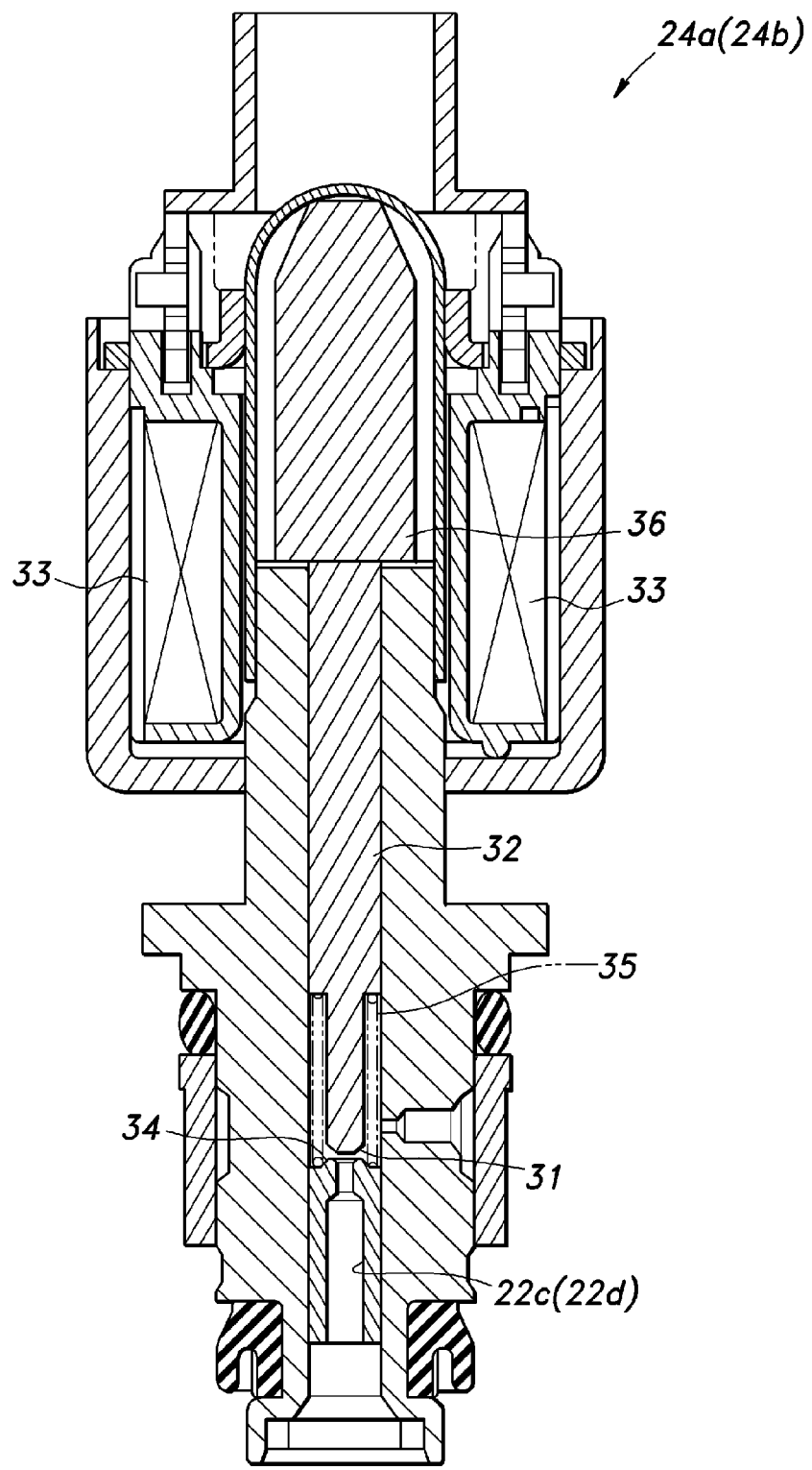
FIG. 3 is a vertical sectional view showing a solenoid valve used in the vehicle brake system.

As shown in FIG. 3, each of the solenoid valves 24a and 24b comprises a plunger 32 having a valve member 31 formed at one end thereof, a solenoid 33 provided around the plunger 32 and a return spring 35 urging the valve member 31 away from a valve seat 34 formed in a housing of the solenoid valve. When the solenoid 33 is not energized, the other end of the plunger 32 abuts a stopper 36 fixedly attached to the housing under the spring force of the return spring 35 so that the valve member 31 is held spaced from the valve seat 34 as shown in FIG. 3. When an electric power greater than a prescribed value is supplied to the solenoid 33, the magnetic force created by the solenoid displaces the plunger 32 in the axial direction (downward in FIG. 3) against the spring force of the return spring 35, causing the valve member 31 to engage the valve seat 34 and shutting the corresponding fluid line 22d, 22d.

Referring to FIG. 2 once again, a cylinder type simulator 28 is provided on the line between the second fluid chamber 17b and the solenoid valve 24b via a normally closed solenoid valve 24c. The simulator 28 is provided with a cylinder having an interior separated by a piston 28a. A fluid receiving chamber 28b is defined on the side of the piston 28a facing the solenoid valve 24b, and a compression coil spring 28c is interposed between the opposite side of the piston 28a and the opposing axial end of the cylinder of the simulator 28. When the brake pedal 11 is depressed to cause the brake fluid in the second fluid chamber 17b to flow into the fluid receiving chamber 18b while the solenoid valves 24a and 24b are closed and the solenoid valve 24c is open, the biasing force of the compression coil spring 28c is transmitted to the brake pedal 11 so that the vehicle operator is caused to experience a brake pedal reaction from the brake pedal 11 in a similar manner as in the case with the conventional brake system in which the master cylinder and the wheel cylinder are directly connected to each other.

The first fluid pressure generating chamber 23a and second fluid pressure generating chamber 23b of the motor actuated cylinder 13 are communicated with a plurality (four, in the illustrated embodiment) of wheel cylinders 2b, 3b via fluid lines 22e and 22f which provided with a VSA system 26 which may consist of a per se known vehicle behavior stabilization control system configured to control an ABS for preventing the locking of wheels at the time of braking, a TCS (traction control system) for preventing the slipping of wheels at the time of acceleration and a side slip control for controlling the side slip of the vehicle at the time of cornering in a coordinated manner. For details of such systems, reference should be made to various prior patent publications on such subject matters. The VSA system 26 includes brake actuators including various hydraulic devices responsible for the control of a first system for the wheel cylinders 2b of the front wheels and a second system for the wheel cylinder 3b of the rear wheels, and a VSA control unit 26a for controlling the various hydraulic devices. The VSA system of the illustrated embodiment is provided with various control functions, but may include only part of such control functions and/or may include other control functions without departing from the spirit of the present invention.

The overall control of the brake fluid pressure generating unit 8 is performed by the control unit 6. The control unit 6 receives the various detection signals from the stroke sensor 11a, the brake pressure sensors 25a and 25b and other sensors (not shown in the drawings) for detecting the behavior of the vehicle. Based on the detection signal from the stroke sensor 11a, and the operating condition of the vehicle that can be determined from the detection signals of the various sensors, the control unit 6 controls the brake fluid pressure generated by the motor actuated cylinder 13. In the case of a hybrid vehicle (or electric vehicle) as is the case with the illustrated embodiment, as the motor/generator provides a regenerative braking, the control unit 6 is configured to control the brake force allocation or control the brake fluid pressure produced by the motor actuated cylinder 13 depending on the extent or magnitude of the regenerative braking.

The mode of control operation during a normal braking is described in the following. FIG. 2 shows the state of the system when the brake pedal 11 is not being operated. The detection value of the stroke sensor 11a is at an initial value (=0), and the control unit 6 does not produce any brake fluid pressure generation signal. At this time, the screw rod 19 of the motor actuated cylinder 13 is in the most retracted position and the two pistons 21a and 21b of the motor actuated cylinder 13 are also in the respective most retracted positions under the spring force of the return springs 27a and 27b so that no brake fluid pressure is produced in either of the fluid pressure generating chambers 23a and 23b.

When the brake pedal 11 is depressed to a certain extent, and the detection value of the stroke sensor 11a has become greater than zero, a brake-by-wire control is performed in such a manner that the two solenoid valves 24a and 24b are closed to prevent the fluid pressure generated by the master cylinder 15 to be transmitted to the motor actuated cylinder 13 and the solenoid 24c is opened to cause the fluid pressure generated by the master cylinder 15 to be transmitted to the simulator 28. Based on the input amount detection value (brake operation amount) detected by the stroke sensor 11a, the control unit 6 determines a target fluid pressure that takes into account the regenerative braking, and forwards a corresponding motor drive command value (operation amount) to the electric servo motor 12. This in turn causes the screw rod 19 and hence the first piston 21a to be pushed out according to this command value, and a brake fluid pressure corresponding to the input or the depression stroke (brake operation amount) of the brake pedal 11 is generated in the first fluid pressure generating chamber 23a. At the same time, the second piston 21b is displaced forward under the pressure in the first fluid pressure generating chamber 23a against the biasing force of the return spring 27b, and the corresponding brake fluid pressure is generated in the second fluid pressure generating chambers 23b.

When the vehicle operator has displaced the brake pedal 11 in the returning direction (or has released the brake pedal), according to the returning stroke of the brake pedal detected by the stroke sensor 11a, the electric servo motor 12 returns the screw rod 19 and hence the first piston 21a towards the initial position such that the brake fluid pressure is diminished by an amount corresponding to the returning stroke or the current depression of the brake pedal 11. When the brake pedal 11 is fully returned to the initial position by the return spring not shown in the drawing, the control unit 6 opens the solenoid valves 24a and 24b. As a result, the brake fluid in the wheel cylinders 2b and 3b is allowed to return to the reservoir tank 16 via the motor actuated cylinder 13 and the braking force is eliminated. As the detected value of the stroke sensor 11a returns to the initial value, the first piston 21a is caused to return to the initial position, and this in turn causes the second piston 21b to return to the initial position owing to the force transmitted via the connecting member 20.

When the normal braking control is performed, the brake fluid pressure generated by the motor actuated cylinder 13 is supplied to the wheel cylinders 2b and 3b of the front and rear wheels via the VSA system 26. When the VSA system 26 performs the braking force distributing control, the braking force of each wheel is individually controlled as commanded by the VSA system 26. When the VSA system 26 is not in operation, the VSA system 26 allows the brake fluid supplied by the motor actuated cylinder 13 to be directly supplied to the wheel cylinders 2b and 3b of the front and rear wheels.

When the regenerative braking is being performed, the control unit 6 causes the motor/generator 5 to operate as a generator such that the amount of the regenerative braking is produced in dependence on the brake operating amount given by the stroke of the brake pedal 11. If the vehicle deceleration commanded by the brake operating amounted (or by the vehicle operator) cannot be produced by the regenerative braking alone, the electric servo motor 12 actuates the motor actuated cylinder 13, and the coordinated combined braking involving both the regenerative braking and the hydraulic braking is performed. In this embodiment, the target brake liquid pressure can be determined by subtracting the regenerative braking force from the total required braking force which is determined by the brake operating amount or the input amount. Alternatively, the operation amount of the motor actuated cylinder may be selected such that a hydraulic braking force corresponding to a certain ratio to the entire required braking force is produced. According to the present invention, this control action may be performed in a per se known manner as long as the operation of the motor actuated cylinder 13 is performed in association with the depression stroke of the brake pedal 11.

The timing of closing the solenoid valve 24c may be selected as the time point at which the fluid pressure of the second fluid chamber 17b has dropped to an adequately low level to cause the piston 28a to return to the initial position illustrated in FIG. 2 under the biasing force of the compression coil spring 28c. For instance, this timing may be selected as the time point when a prescribed time period has elapsed since the two solenoid valves 24a and 24b are closed. It is also possible to select the timing when the detection value of the brake pressure sensor 25b on the side of the motor actuated cylinder 13 has dropped below a prescribed value such as zero.

Figure 4:
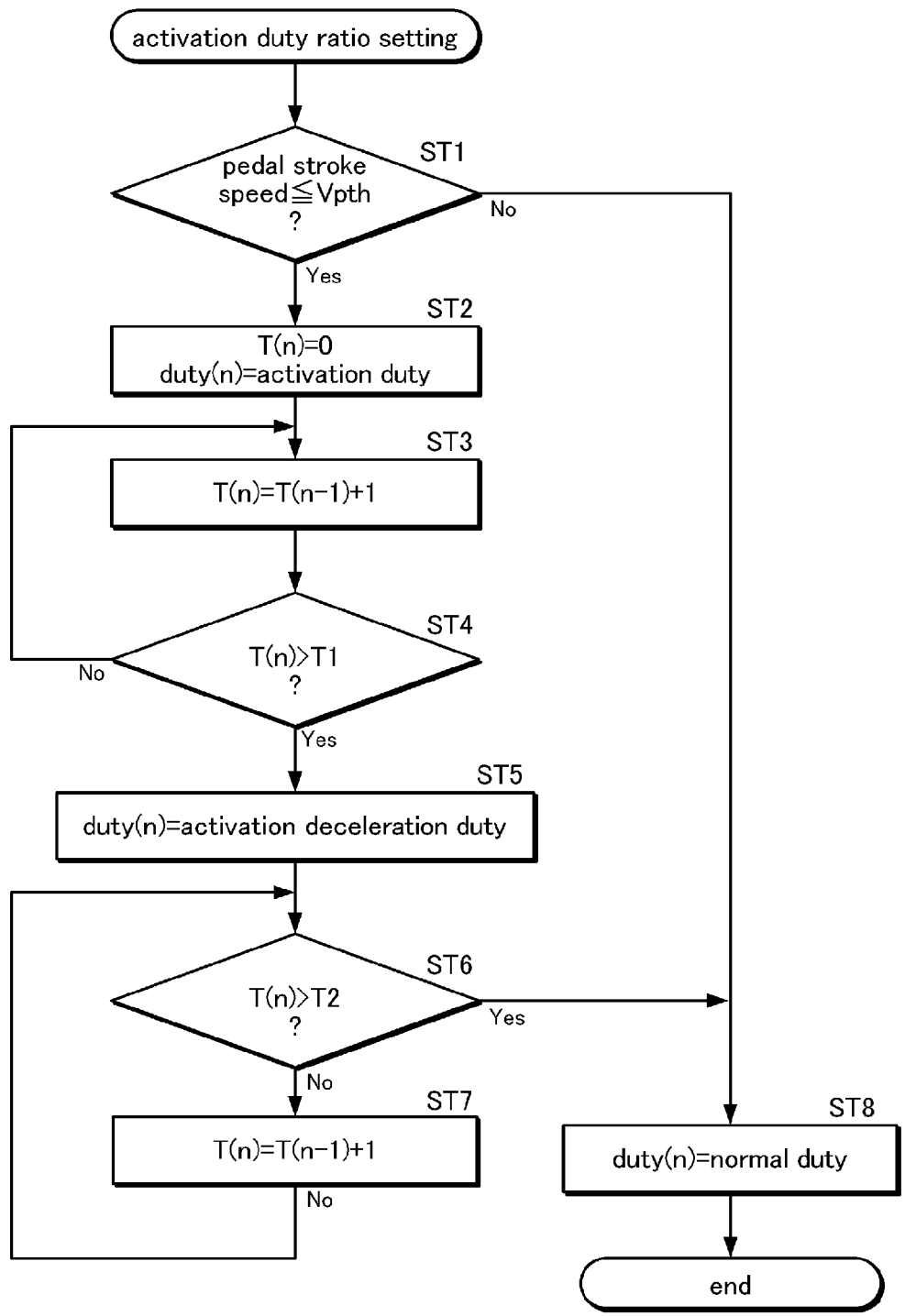
FIG. 4 is a flowchart showing a control process for setting the duty ratio of the electric power supplied to the solenoid valve at the time of activating the brake.

The control process for the solenoid valves 24a and 24b by the control unit 6 is described in the following with reference to FIGS. 4 to 6. As the solenoid valves 24a and 24b are identical to each other in structure, and are operated in a similar manner, the solenoid valves 24a and 24b are collectively referred to as the solenoid valve 24 in the following description for the convenience of description.

When the brake pedal 11 is operated and the detection value of the stroke sensor 11a increases from the initial value, the control unit 6 operates the solenoid valve 24 at a required duty ratio based on PWM control so that a brake fluid pressure corresponding to the pedal stroke may be produced. In particular, a drive flag of the solenoid valve 24 is set as "1", and the duty ratio D for the solenoid valve 24 is set by executing an activation duty ratio setting process shown in FIG. 4.

When the drive flag of the solenoid valve 24 is set as "1", the control unit 6 computes a pedal stroke speed Vp from the detected value of the stroke sensor 11a, and determines if the computed pedal stroke speed Vp is equal to or smaller than a prescribed threshold value Vpth in step ST1. If the computed pedal stroke speed Vp is greater than the prescribed threshold value Vpth or the determination result of step ST1 is No, the control unit 6 sets the duty ratio D for the solenoid valve 24 as a normal duty ratio D1 in step ST8, and terminates the activation duty ratio setting process. When the stroke speed of the brake pedal is high, it means that a powerful braking is desired, and it is appropriate to shut the solenoid valves 24a and 24b as quickly as possible while the noises generated by the solenoid valves 24a and 24b are of a small concern.

The following terms may be represented with alternate names as set out below in the claims:

| Term | Alternate Name |
| --- | --- |
| D1 | $D_{clos}$ |
| D2 | $D_{init}$ |
| D3 | $D_{dc11}$ |
| D4 | $D_{rls}$ |
| D5 | $D_{dc12}$ |

When the computed pedal stroke speed Vp is equal to or smaller than the prescribed threshold value Vpth or the determination result of step ST1 is Yes, the control unit 6 initializes a timer (set the zero value thereon), and sets the duty ratio D for the solenoid valve 24 as an activation duty ratio D2 which is greater than the normal duty ratio D1 in step ST2. Then, the control unit 6 adds value "1" to the timer in step ST3, and determines if the time set on the timer has exceeded a first prescribed time period T1 in step ST4. The first prescribed time period T1 is slightly shorter than the time period required for the plunger 32 to reach the fully closed position from the start of supplying electric power to the solenoid 33 when the electric current of the activation duty ratio D2 is supplied to the solenoid 33.

If the time set on the timer has not exceeded the first prescribed time period T1 in step ST4 or the determination result of step ST4 is No, steps ST3 and ST4 are repeated. Once the time set on the timer has exceeded the first prescribed time period T1 or once the determination result of step ST4 has changed to Yes, the control unit 6 sets the duty ratio D for the solenoid valve 24 as an activation deceleration duty ratio D3 in step ST5. The activation deceleration duty ratio D3 is smaller than the normal duty ratio D1, and is hence smaller than the activation duty ratio D2. In the illustrated embodiment, the activation deceleration duty ratio D3 is selected as a value that balances with the spring force of the return spring 35 when the plunger 32 is at the fully closed position. In this case, as shown in FIG. 6, the movement of the plunger 32 may be temporarily suspended prior to reaching the fully closed position.

Thereafter, the control unit 6 determines if the time on the timer has exceeded a second prescribed time period T2 in step ST6. The second prescribed time period T2 is selected as a value that reduces the displacement speed of the plunger 32 to a desired extent when the electric current of the actuation duty ratio D2 is supplied to the solenoid 33 for the first prescribed time period T1, and it is followed by the supply of electric current of the activation deceleration duty ratio D3 to the solenoid 33 for the second prescribed time period T2. If the time on the timer has not exceeded the second prescribed time period T2 and, therefore, the determination result of step ST6 is No, the value "1" is added to the timer in step ST7, and the program flow returns to step ST6.

Once the second prescribed time period T2 has elapsed in step ST6, and, therefore, the determination result of step ST6 has changed to Yes, the control unit 6 sets the duty ratio for the solenoid valve 24 to the normal duty ratio D1 in step ST8, and terminates the activation duty ratio setting process. As shown in FIG. 6, the plunger 32 may then resume movement and complete its travel to the valve seat 34. Thereafter, the solenoid valve 24 is held in the fully closed state by the solenoid 33 energized by the electric current of the normal duty ratio D1 against the biasing force of the return spring 35. As can be readily appreciated, the normal duty ratio D1 is selected as a level which is adequate to hold the valve in the fully closed position against the biasing force of the return spring 35.

Figure 5:
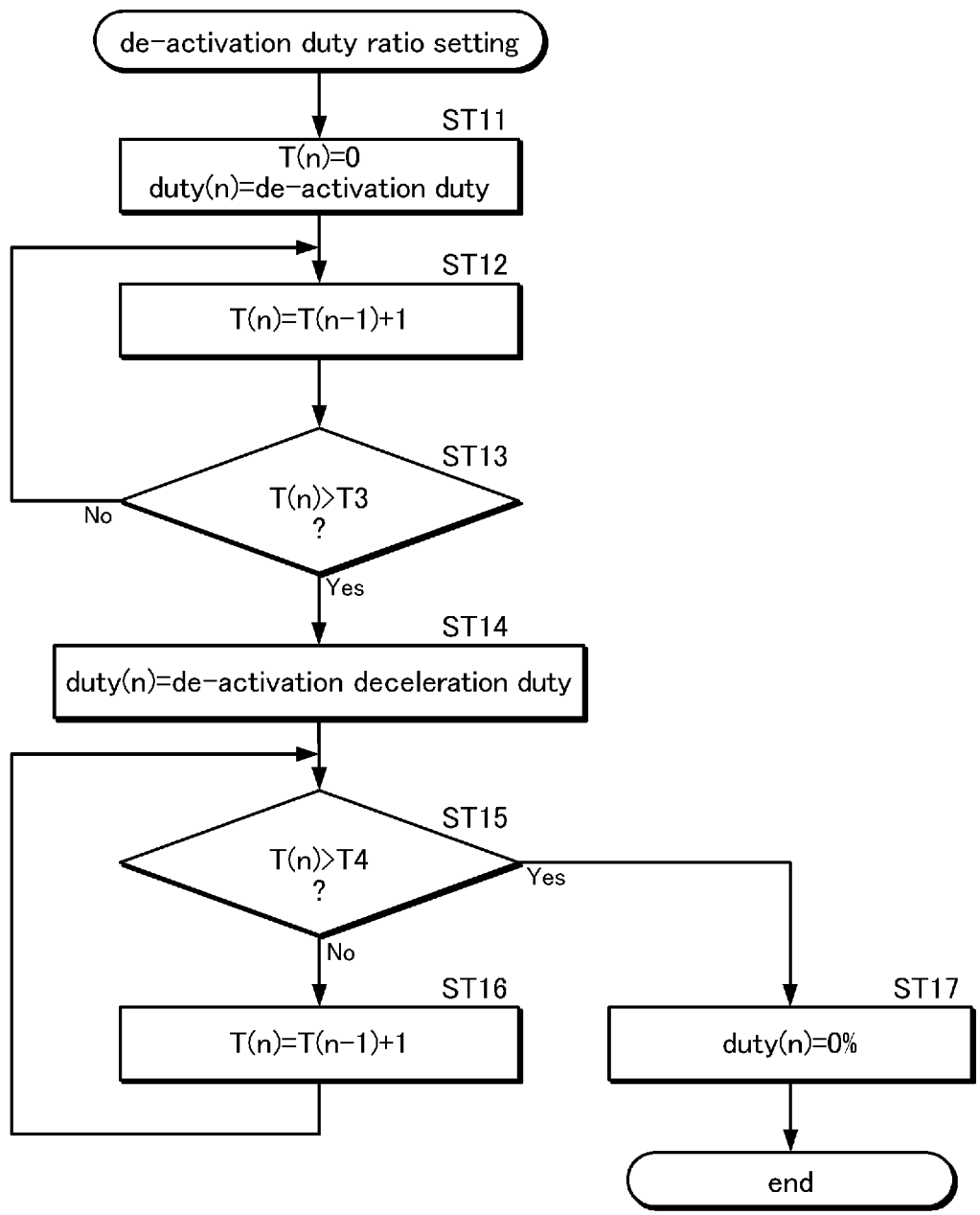
FIG. 5 is a flowchart showing a control process for setting the duty ratio of the electric power supplied to the solenoid valve at the time of releasing the brake.

When the brake pedal 11 is released, and the detection value of the stroke sensor 11a has returned to the initial value, the control unit 6 sets the drive flag for the solenoid valve 24 to "0", and sets the duty ratio D for the solenoid valve 24 by executing a deactivation duty ratio setting process shown in FIG. 5.

When the drive flag for the solenoid valve 24 is set to "0", the control unit 6 initializes a timer (set the zero value thereto), and sets the duty ratio D for the solenoid valve 24 as a de-activation start duty ratio D4 in step ST11. The de-activation start duty ratio D4 is selected such that the plunger 32 can be displaced from the fully closed position to the fully open position under the spring force of the return spring 35, and may consist of zero as is the case with the illustrated embodiment. Then, the control unit 6 adds value "1" to the timer in step ST12, and determines if the time set on the timer has exceeded a third prescribed time period T3 in step ST13. The third prescribed time period T3 is slightly shorter than the time period required for the plunger 32 to reach the fully open position from the fully closed position (under the spring force of the return spring 35) when the electric current of the de-activation start duty ratio D4 is supplied to the solenoid 33.

If the time set on the timer has not exceeded the third prescribed time period T3 in step ST13 or the determination result of step ST13 is No, steps ST12 and ST13 are repeated. Once the time set on the timer has exceeded the third prescribed time period T3 in step ST13 or once the determination result of step ST13 has changed to Yes, the control unit 6 sets the duty ratio D for the solenoid valve 24 as a de-activation deceleration duty ratio D5 in step ST14. The de-activation deceleration duty ratio D5 is greater than the de-activation start duty ratio D4. In the illustrated embodiment, the de-activation deceleration duty ratio D5 is selected as a value that balances with the spring force of the return spring 35 when the plunger 32 is at the fully open position. In this case, as shown in FIG. 6, the movement of the plunger 32 may be temporarily suspended prior to the plunger reaching the fully open position.

Thereafter, the control unit 6 determines if the time on the timer has exceeded a fourth prescribed time period T4 in step ST15. If the time on the timer has not exceeded the fourth prescribed time period T4 or the determination result of step ST15 is No, the value "1" is added to the timer in step ST16, and the program flow returns to step 15. If the fourth prescribed time period T4 has elapsed, and, therefore, the determination result of ST 15 has changed to Yes, the control unit 6 sets the duty ratio D for the solenoid valve 24 to zero in step ST17, and terminates the deactivation duty ratio setting process. As a result and as shown in FIG. 6, the plunger 32 may resume movement and complete its travel to the stopper 36. After reaching the stopper, the solenoid valve 24 is held at the fully opening position under the spring force of the return spring 35.

The activation duty ratio D2, the activation deceleration duty ratio D3, the first prescribed time period T1 and the second prescribed time period T2 may be selected such that the following relationship holds.

$$(D2-D1) \times T1 = (D1-D3) \times (T2-T1) \tag{1}$$

In other words, the time average of the electric current during the time interval of T0 to T2 including the interval of the activation deceleration duty ratio D3 and the interval of the activation duty ratio D2 is equal to the normal duty ratio D1.

Figure 6:
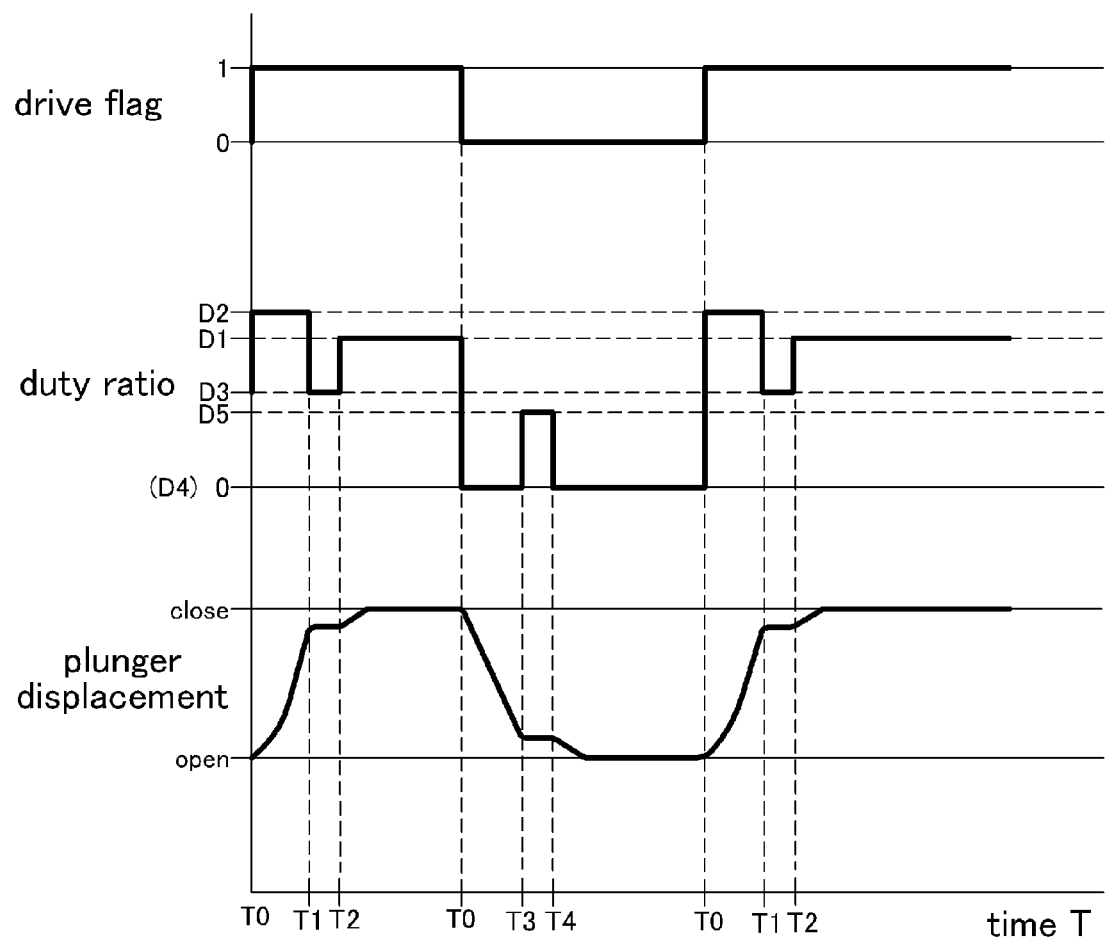
FIG. 6 is a time chart showing the duty ratio of the electric power supplied to the solenoid valve and the displacement of the plunger of the solenoid valve according to the present invention.

By controlling the solenoid valves 24a and 24b in this manner, the plunger 32 displaces as illustrated in FIG. 6 when the pedal stroke speed Vp is equal to or less than the threshold value VPth. More specifically, when the brake pedal 11 is operated, and the drive flag is set to "1", the plunger 32 is initially driven by the activation duty ratio D2 which is greater than the normal duty ratio D1, and the duty ratio is changed to the de-activation deceleration duty ratio D3 which is smaller than the normal duty ratio D1 immediately before the plunger 32 reaches the fully closed position. Therefore, the plunger 32 is decelerated as it approaches the fully closed position.

When the brake pedal 11 is released, and the drive flag is set to "0", the plunger 32 is initially driven toward the fully open position under the spring force of the return spring 35 while the duty ratio is at the de-activation duty ratio D4 which may be zero, and the duty ratio is changed to the de-activation deceleration duty ratio D5 as the plunger approaches the fully open position. After the plunger 32 is adequately decelerated by the de-activation deceleration duty ratio D5, the supply of electric current to the solenoid 33 is terminated, and the plunger 32 is held at the fully open position under the spring force of the return spring 35.

Figure 7:
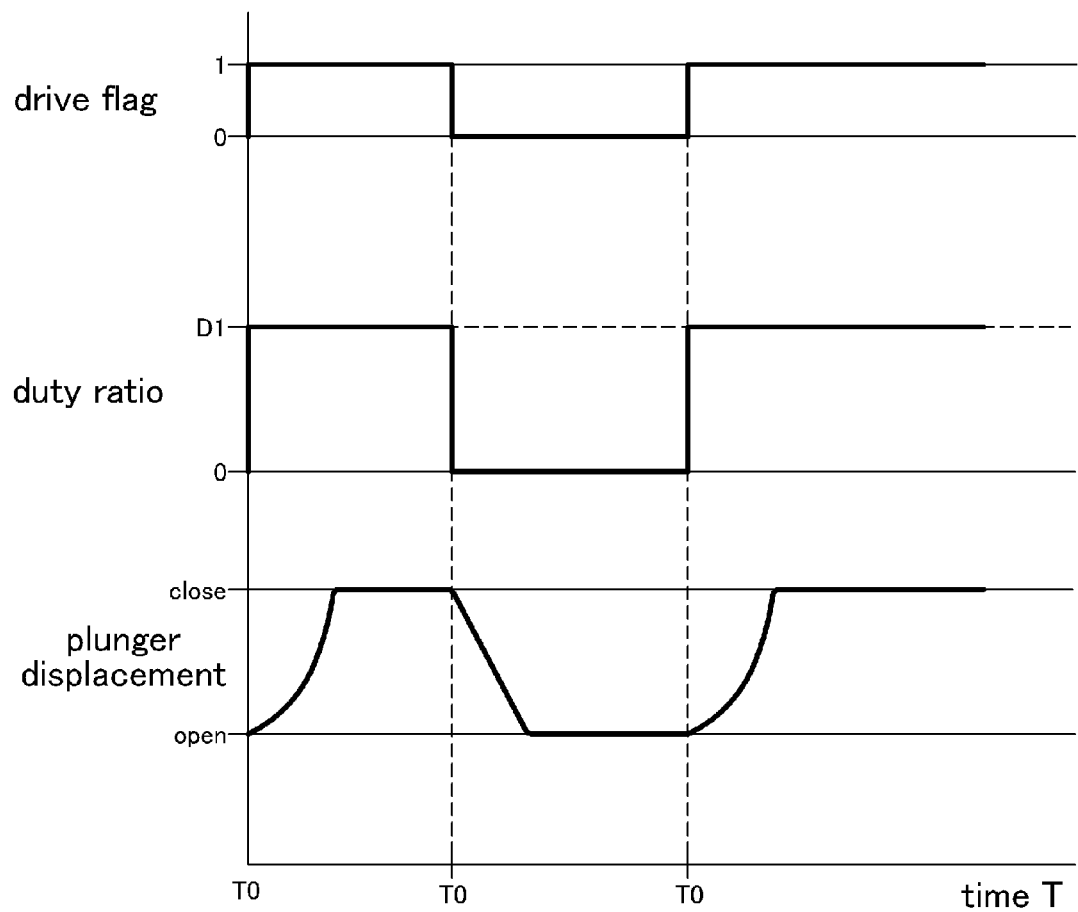
FIG. 7 is a time chart similar to that of FIG. 6 showing the mode of operation of the prior art.

On the other hand, according to the conventional arrangement shown in FIG. 7, the solenoid valves 24a and 24b are driven by a fixed duty ratio. In this case, the speed of the plunger 32 is at the maximum level when arriving at the fully closed position and the fully open position so that the noises that are generated when the valve member 31 strikes the valve seat 34 and when the plunger 32 abuts the stopper 36 are significant. However, according to the present invention, the speed of the plunger is controlled when the valve member 31 strikes the valve seat 34 and when the plunger 32 abuts the stopper 36 so that the generation of noises can be minimized.

Even though the speed at which the plunger 32 strikes the stopper 36 is reduced, the initial speed of actuating the plunger 32 is increased because the activation duty ratio D2 is greater than the normal duty ratio D1, and the overall time period required for the plunger 32 to travel from the fully open position to the fully closed position can be minimized.

By performing the process for decelerating the plunger in a late part of each stroke of the plunger (steps ST2 to ST7) only when the pedal stroke speed Vp is equal to or smaller than the prescribed threshold value Vpth, the rapid and accurate operation of the brake system can be performed in response to a rapid depression of the brake pedal which typically indicates the need for a powerful braking.

Because the normal duty ratio D1 is smaller than the activation duty ratio D2, the increase in the initial speed of the plunger 32 and the minimization of power consumption of the solenoid in the fully closed position can be achieved at the same time.

The power consumption of the solenoid can be made no different from that of the conventional arrangement if the time average of the electric current during the time interval of T0 to T2 including the interval of the activation deceleration duty ratio D3 and the interval of the activation duty ratio D2 is equal to the normal duty ratio D1. Thereby, the load of the solenoid is no greater than the conventional arrangement, and the existing design can be used without causing any undue stress to the solenoid valve.

Although the present invention has been described in terms of a preferred embodiment thereof, it is obvious to a person skilled in the art that various alterations and modifications are possible without departing from the scope of the present invention which is set forth in the appended claims.

The present invention is most advantageously used in brake-by-wire brake systems which combine the hydraulic braking and the regenerative braking in an intelligent manner, but also to more conventional brake-by-wire systems using only the hydraulic braking.

The contents of the original Japanese patent application on which the Paris Convention priority claim is made for the present application as well as the contents of the prior art references mentioned in this application are incorporated in this application by reference.

The invention claimed is:

1. A method of reducing noise from closing a solenoid controlled ON-OFF valve in a brake-by-wire system, said method including the steps of:
   a) receiving a signal from a brake pedal;
   b) based on the signal from the brake pedal, determining a desired speed for closing an ON-OFF valve in the brake-by-wire system;
   c) based on the desired speed for closing the ON-OFF valve, supplying electric power at a first level to the solenoid;
   d) after a first time period slightly shorter than the time required for a plunger in the ON-OFF valve to reach the fully closed position, supplying electric power at a second level to the solenoid, the second level lower than the first level;
   e) after a second time period, supplying electric power at a third level to the solenoid, the third level intermediate between the first level and the second level;
   wherein a plunger of the solenoid is opposed by a spring, and wherein motive force supplied by the second level of power is substantially equal to a force of the spring, whereby movement of the plunger is temporarily suspended until electric power is supplied at the third level.

2. A vehicle brake system, comprising:
   a master cylinder configured to be actuated by a brake pedal and receive a supply of brake fluid from a reservoir;
   an input sensor for detecting an operation of the brake pedal;
   a motor actuated cylinder configured to be actuated by an electric motor according to a control signal and receive a supply of brake fluid from the reservoir;
   a solenoid shut-off valve provided in a fluid line between the master cylinder and the motor actuated cylinder, the solenoid shut-off valve comprising a plunger provided with a valve member, a valve seat provided in a housing of the solenoid valve and configured to cooperate with the valve member, a return spring urging the plunger in a valve opening direction, a solenoid for actuating the plunger in a valve closing direction when energized and a stopper for mechanically limiting a stroke of the plunger in the valve opening direction; and
   a control unit for providing the control signal to the motor actuated cylinder according to a detection signal from the input sensor and closing the solenoid shut-off valve when the master cylinder is actuated in response to the detection signal from the input sensor, the control unit comprising a timer;
   wherein the control unit is configured to determine if standard or accelerated braking is required based on the detection signal; and if standard braking is required, is further configured to:
      initialize the timer to a zero value to define a time $t_{zero}$;
      starting at the time $t_{zero}$ and for a time period $T_1$, operate the solenoid with an activation duty ratio $D_{init}$ to move the plunger in the valve closing direction, $T_1$ being slightly shorter than a time period required for the plunger to be fully closed after $t_{zero}$ when an electric current of the activation duty ratio $D_{init}$ is supplied to the solenoid;
      after completion of $T_1$ and for a time period $T_2$, operate the solenoid with a reduced duty ratio $D_{dcl1}$, $D_{dcl1}$ being less than $D_{init}$, in order to decelerate the plunger prior to the plunger reaching the valve seat;
      after completion of $T_2$, operate the solenoid with a duty ratio $D_{clos}$, $D_{clos}$ being intermediate to $D_{dcl1}$ and $D_{init}$, such that the plunger is advanced to and held in a fully closed position against the valve seat.

3. The vehicle brake system according to claim 2, wherein the duty ration $D_{dcl1}$ is the duty ratio required to generate a force on the plunger that balances the force generated by the return spring when the plunger is in the fully closed position.

4. The vehicle brake system according to claim 2, wherein the time periods T1 and T2 are determined by the timer.

5. The vehicle brake system according to claim 2, wherein upon receiving a release signal from the input sensor indicating that the brake pedal has been released while the plunger is in a fully closed position, the controller is further configured to:
   initialize the timer to a zero value to define a time $t_{zero}$;
   starting at the time $t_{zero}$ and for a time period $T_3$, operate the solenoid with an activation duty ratio $D_{rls}$ to allow the plunger to be moved in the valve opening direction by the force of the return spring, $T_3$ being slightly shorter than a time period required for the plunger to be fully opened after $t_{zero}$ when an electric current of the activation duty ratio $D_{rls}$ is supplied to the solenoid;
   after completion of $T_3$ and for a time period $T_4$, operate the solenoid with an increased duty ratio $D_{dcl2}$, $D_{dcl2}$ being greater than $D_{rls}$, in order to decelerate the plunger prior to the plunger reaching the stopper;
   after completion of $T_4$, supply of electric current to the solenoid is terminated, such that the plunger is advanced to and held in a fully opened position against the stopper by the force of the return spring.

6. The vehicle brake system according to claim 5, wherein the duty ratio $D_{rls}$ is zero.

7. The vehicle brake system according to claim 5, wherein the duty ration $D_{dcl2}$ is the duty ratio required to generate a force on the plunger that balances the force generated by the return spring when the plunger is in the fully open position.

* * * * *